United States Patent
Rossetto et al.

(10) Patent No.: US 11,510,520 B2
(45) Date of Patent: Nov. 29, 2022

(54) COFFEE MACHINE PROVIDED WITH A COFFEE MILL AND PROCESS TO CONTROL THE COFFEE MILL OF THE COFFEE MACHINE

(71) Applicant: De'Longhi Appliances S.R.L., Treviso (IT)

(72) Inventors: Giovanni Rossetto, Treviso (IT); Andrea Zottarel, Treviglio (IT); Giuseppe De'Longhi, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 500 days.

(21) Appl. No.: 16/617,807

(22) PCT Filed: May 28, 2018

(86) PCT No.: PCT/EP2018/063960
§ 371 (c)(1),
(2) Date: Nov. 27, 2019

(87) PCT Pub. No.: WO2018/219878
PCT Pub. Date: Dec. 6, 2018

(65) Prior Publication Data
US 2020/0187706 A1 Jun. 18, 2020

(30) Foreign Application Priority Data
May 30, 2017 (IT) .................. 102017000058749

(51) Int. Cl.
*A47J 31/42* (2006.01)
*A47J 31/46* (2006.01)
(Continued)

(52) U.S. Cl.
CPC ............. *A47J 31/42* (2013.01); *A47J 31/468* (2018.08); *A47J 31/525* (2018.08); *A47J 31/56* (2013.01); *A47J 42/08* (2013.01); *A47J 42/44* (2013.01)

(58) Field of Classification Search
CPC ......... A47J 31/42; A47J 31/468; A47J 31/525
See application file for complete search history.

(56) References Cited

U.S. PATENT DOCUMENTS

2005/0279219 A1* 12/2005 Turi ................ A47J 42/16
99/286
2009/0056555 A1* 3/2009 Beule .................. A47J 31/42
222/1
(Continued)

FOREIGN PATENT DOCUMENTS

CH 677438 A5 5/1991

OTHER PUBLICATIONS

The Search Report and Written Opinion for PCT/EP2018/063960 dated Jul. 9, 2018.

*Primary Examiner* — Faye Francis
(74) *Attorney, Agent, or Firm* — Blank Rome LLP

(57) ABSTRACT

A control unit, a pump for supplying infusion water, a boiler for heating the infusion water, an infusion unit, a coffee mill, and a user interface including a selector for a beverage and/or a ground coffee dose. The coffee mill has a hopper for coffee beans, a rotating and a non-rotating grinder, a motor for directly or indirectly driving the rotating grinder, all with capability to adjust the distance between the grinders. A first sensor detects a number of turns and/or speed of the motor and/or of the rotating grinder. A second sensor detects a distance between the grinders. The control unit stores an algorithm for calculating a correct dose of ground coffee, configured to receive the value of ground coffee selected and
(Continued)

the distance between the grinders to automatically generate the number of motor turns necessary to obtain the correct dose of ground coffee.

8 Claims, 1 Drawing Sheet

(51) Int. Cl.
*A47J 31/52* (2006.01)
*A47J 31/56* (2006.01)
*A47J 42/08* (2006.01)
*A47J 42/44* (2006.01)

(56) References Cited

U.S. PATENT DOCUMENTS

| | | | |
|---|---|---|---|
| 2009/0095165 A1* | 4/2009 | Nosler | A47J 31/007 |
| | | | 426/433 |
| 2010/0095852 A1 | 4/2010 | Remo et al. | |
| 2010/0198413 A1 | 8/2010 | De' Longhi | |
| 2011/0283888 A1* | 11/2011 | Pozzari | A47J 31/42 |
| | | | 99/285 |
| 2016/0051081 A1* | 2/2016 | Grassia | A47J 31/525 |
| | | | 99/280 |
| 2016/0058244 A1* | 3/2016 | Laffi | A47J 42/00 |
| | | | 241/36 |
| 2020/0187706 A1* | 6/2020 | Rossetto | A47J 42/44 |
| 2022/0117442 A1* | 4/2022 | Dionisio | A47J 42/46 |

* cited by examiner

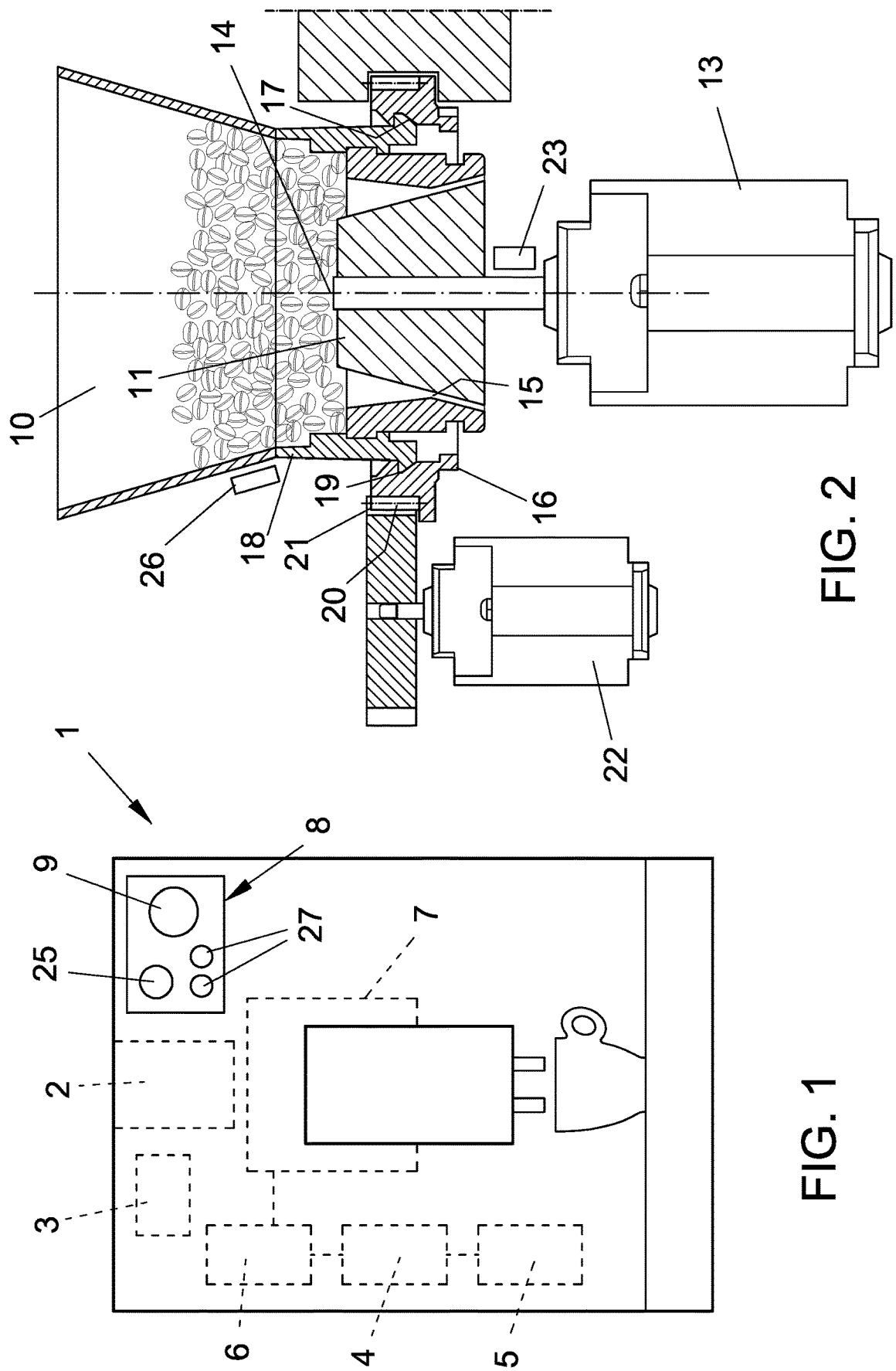

COFFEE MACHINE PROVIDED WITH A COFFEE MILL AND PROCESS TO CONTROL THE COFFEE MILL OF THE COFFEE MACHINE

RELATED APPLICATIONS

This application is a U.S. national phase application of International Application No. PCT/EP2018/063960, filed May 28, 2018; which application claims benefit of priority of Italy Application No. 102017000058749, filed May 30, 2017. Each of the above-identified related applications are incorporated by reference.

FIELD OF USE

The present invention relates to a coffee machine provided with a coffee mill and to a process to control the coffee mill of the coffee machine.

BACKGROUND OF THE INVENTION

As is well known, the definition of the correct dose of ground coffee at a given particle size with which brewing takes place lies at the basis of a brew that may correctly correspond to the selection made on each occasion by the user.

The particle final size of the ground coffee powder is one of the most important variables in determining the final result.

The final particle size of the coffee power strongly influences the hydraulic conditions of percolation by determining the pressure drop of the percolation water and consequently the flow rate delivered by the pump and the thermal behaviour of the boiler.

A finer grind leads to a greater extraction of the substances contained in the coffee, producing a stronger and more full-bodied beverage with the production of abundant crema, whereas a coarser grind is more suitable for preparing a less extracted coffee with less crema.

The selection of the particle size is generally defined by the user by manually setting a ring nut for adjusting the gap between the grinders.

The definition of the correct dose of ground coffee at a given particle size in accordance with the user's taste is made difficult by the variability of many parameters depending, on the one hand, on the type of coffee used, in particular the batch, brand, roast, and its moisture content, and, on the other hand, on the coffee mill, in particular the grinding system, mechanical adjustment at the end of the breaking-in period, the wear on the grinders, and the amount of coffee introduced.

Today in general the control unit of a coffee machine, upon acquiring the beverage to be dispensed and possibly the flavour selected by the user and/or the distancing of the grinders, defines the grinding time in such a way as to produce a dose of ground coffee that is sometimes imprecise, with the consequence that the flavour of the product in the cup does not always correspond to the one selected by the user.

SUMMARY OF THE INVENTION

The technical task of the present invention, therefore, is to provide a coffee machine and a process to control a coffee mill of said coffee machine that makes it possible to eliminate the above-mentioned technical drawbacks of the prior art.

Within the scope of this technical task one object of the invention is to provide a process to control a coffee mill of a coffee machine that makes it possible to define a correct dose of ground coffee such as to make the organoleptic characteristics of the product in the cup correspond to those actually selected by the user.

The technical task, as well as these and other objects, are achieved according to the present invention by providing a coffee machine comprising a control unit, a pump for supplying infusion water, a boiler for heating the infusion water, an infusion unit, a coffee mill, user interface means comprising at least a selector for a beverage and/or a ground coffee dose, said coffee mill comprising in turn a hopper for coffee beans, a rotating grinder and a non-rotating grinder, a motor for driving the rotating grinder, and means for adjusting the distance between the grinders, characterised in that it comprises a first sensor for detecting the number of turns and/or speed of the motor and/or of the rotating grinder, and a second sensor for detecting the distance between the grinders, and characterised in that said control unit stores an algorithm for calculating the correct dose of coffee, said calculation algorithm being configured to receive as an input from the selector the value of ground coffee selected and from the second sensor the value of the distance between the grinders so as to automatically generate as an output the value of the number of total turns that the motor must perform to obtain the correct dose of ground coffee, said control unit being configured to receive as an input from the first sensor the current value of the number of turns and/or of the speed of the motor and/or of the rotating grinder so as to produce a stop signal for stopping the motor upon reaching said number of total turns.

In a preferred embodiment of the invention, there are provided fine manual adjustment means for adjusting said number of total turns calculated by the algorithm.

In a preferred embodiment of the invention, said fine manual adjustment means comprise a flavour selector comprised in said interface means.

In a preferred embodiment of the invention, there is provided a third sensor for detecting the presence in the hopper of a minimum amount of coffee beans.

The infusion parameters can be pre-set and/or there can be provided fine manual adjustment means for adjusting the infusion parameters.

In a preferred embodiment of the invention, said infusion parameters comprise the boiler temperature and/or the length of the infusion process and/or the phases thereof, and/or the infusion flow rate.

In a preferred embodiment of the invention said fine manual adjustment means for adjusting the infusion parameters comprise a selector comprised in said user interface means.

The present invention likewise discloses a process to control a coffee mill of a coffee machine, wherein said coffee machine comprises a control unit, a pump for supplying infusion water, a boiler for heating the infusion water, an infusion unit, user interface means comprising at least a selector for a beverage and/or a ground coffee dose, and wherein said coffee mill comprises in turn a hopper for coffee beans, a rotating grinder and a non-rotating grinder, a motor for driving the rotating grinder, and means for adjusting the distance between the grinders, characterised in that the control unit, to perform a grinding process, operates as follows:

it acquires from the selector the selection of the ground coffee dose;

it acquires the value of the distance between the grinders;

it calculates the number of total turns that the motor (13) must perform during the grinding process to obtain the correct dose of ground coffee on the basis of the acquired selection of the ground coffee dose and the value of the distance between the grinders;

it activates the grinding process by driving in rotation the rotating grinder;

it acquires, during the grinding process, the current value of the number of turns and/or of the speed of the motor and/or of the rotating grinder; and it stops the rotation of the motor upon reaching said number of total turns.

BRIEF DESCRIPTION OF THE DRAWINGS

Additional features and advantages of the invention will become more apparent from the description of a preferred but non-exclusive embodiment of the coffee machine and of the process to control the coffee mill of the coffee machine according to the invention, illustrated by way of non-limiting example in the appended drawing, in which:

FIG. 1 shows a diagram of a coffee machine with an incorporated coffee mill in accordance with the invention; and FIG. 2 shows a possible construction of the coffee mill in greater detail.

DETAILED DESCRIPTION OF THE ILLUSTRATED EMBODIMENTS

With reference to the cited figures, a coffee machine 1 provided with a coffee mill 2 is shown.

In addition to the coffee mill 2, the coffee machine 1, in a known manner, comprises a control unit 3 in communication with a pump 4 for supplying infusion water connected on the inlet side to a tank 5 or directly to the mains water supply, a boiler 6 for heating the infusion water, an infusion unit 7, and user interface means 8 comprising at least a selector 9 for a beverage and/or a ground coffee dose.

The user interface means 8 can comprise selectors of varying nature; for example, the selector 9 can be a knob or a mechanical or virtual pushbutton, created in the latter case by means of touch screen technology.

The interface means 8 are generally positioned on the control panel of the coffee machine.

A construction of an already known type of coffee mill 2 is described below purely by way of example.

The coffee mill 2 comprises a hopper 10 for coffee beans, a pair of grinders 11, 12, a motor 13 for driving the grinders 11, 12 in relative rotation, and means for adjusting the distance between the grinders 11, 12.

In particular, the coffee mill 2 comprises a rotating grinder 11 and a non-rotating grinder 12 that are coaxial relative to an axis 14 and delimit a gap 15, which determines the particle size, where grinding takes place.

The rotating grinder 11 is drivable in rotation about the axis 14 by means of the motor 13, whilst suitable means for adjusting the gap 5 comprising a ring nut 16 are operatively engaged with the non-rotating grinder 12 to make it translate in parallel with the axis 14 so as to be able to modify the width of the gap 15.

In particular, a tooth 17 projecting radially from the outer perimeter of a receptacle 18 supporting the non-rotating grinder 12 engages with a cam profile 19 present along the inner lateral wall of the adjustment ring nut 16, which in turn has outer teeth 20 meshing with a gear 21 borne by the shaft of a sensor 22 which enables a calculation of the width of the gap 15.

One of the grinders, in particular the rotating one 11, further has a clutch (not shown) which disengages it from the motor 13 when a moment of friction is created between the grinders 11, 12, blocking their reciprocal rotation.

The blockage of the relative rotation between the grinders 11, 12 can be caused by the presence of small stones, coconut peels and other impurities in the coffee to be ground.

Grinders with a different construction from the one just described can obviously be provided and fall within the scope of the invention.

Advantageously, the coffee machine 1 comprises a first sensor 23 for detecting the number of turns and/or speed of the motor 13 and/or of the grinders 11, 12 and the second sensor 22 for detecting the distance between the grinders 11, 12.

The first sensor 23 is preferably a proximity sensor capable of performing the measurement without direct contact.

The second sensor 22 can in turn be a potentiometric transducer which reads the angular position of the ring nut 16 or else a laser sensor, an extensometer, a capacitive sensor, a potentiometer, an encoder, etc.

The first sensor 23 and the second sensor 22 are in communication with the control unit 3 of the coffee machine 1.

Moreover, the control unit 3 of the coffee machine 1 stores an algorithm for calculating the correct dose of ground coffee.

Advantageously, the calculation algorithm is configured to receive as an input from the selector 9 the value of ground coffee selected and from the second sensor 22 the value of the distance between the grinders 11, 12 so as to automatically generate as an output the value of the number of total turns that the motor 13 must perform at a given distance between the grinders 11, 12 to obtain the correct dose of ground coffee.

The control unit 3 is further configured to receive as an input from the first sensor 23 the current value of the number of turns and/or of the speed of the motor 13 and/or of the rotating grinder 11, so as to produce a stop signal for stopping the motor 13 upon reaching the number of total turns calculated.

Number of turns means an angular spatial parameter expressed, for example, in degrees and/or number of pulses corresponding to an angular value.

Calculating the ground coffee dose on the basis of a number of turns is extremely more precise than calculating it on the time basis used up to now, as it is not affected by any variations in the speed of the motor 13 and/or grinders 11, 12, which can occur during grinding, for example because of a variable trend in the relative motion resisting torque between the grinders 11, 12 and/or variations in the power supply voltage depending on the site of installation of the coffee machine.

Advantageously, the coffee machine 1 also comprises fine manual adjustment means for adjusting the number of total turns calculated by the algorithm.

Said adjustment means enable the user to personalise the flavour as desired by modifying the amount of ground coffee compared to the one calculated by the algorithm.

The fine manual adjustment means comprise, for example, a flavour selector 25 provided in the interface means 8.

Advantageously, the coffee machine 1 also comprises a third sensor 26 for detecting the presence in the hopper 10 of a minimum amount of coffee beans.

The third sensor 26 communicates with the control unit 3 to prevent grinding when the presence of an amount of beans insufficient to produce the correct ground coffee dose selected is detected in the hopper 10.

The infusion parameters comprise, in particular, the boiler temperature, and/or the duration of the infusion process and/or the phases thereof (pre-infusion and actual infusion), and/or the pressure and/or flow rate during the (pre-infusion and actual infusion).

The infusion parameters can be pre-set but, advantageously, the coffee machine 1 can also have fine manual adjustment means for adjusting the infusion parameters, for example made up once again of one or more selectors 27 provided in the interface means 8.

The grinding process is carried out as follows.

The control unit 3 acquires from the selector 9 the selection, made by the user, of the dose of coffee to be ground, as it is associated with the selected beverage, and from the second sensor 22 it acquires the value of the distance between the grinders 11, 12.

The control unit 3 enters into the calculation algorithm the value of ground coffee selected and the value of the distance between the grinders 11, 12.

The calculation algorithm automatically generates as an output the value of the number of total turns that the motor 13 must perform to obtain the correct dose of ground coffee.

At this point the control unit activates the grinding process by driving in rotation the motor 13, which in turn drives in rotation the grinders 11, 12.

While the motor 13 is rotating, the control unit 3 acquires from the first sensor 23 the current value of the number of turns and/or of the speed of the motor 13 and/or of the grinder 11.

If it directly acquires the number of turns, the control unit 3 compares the current number of turns with the one calculated by the algorithm and stops the rotation of the motor 13 when the current number of turns reaches number of total turns calculated by the algorithm.

If, on the other hand, it acquires the speed of the motor 13 or grinder 11, the control unit 3 performs an integration in the time domain of the acquired data to derive therefrom the current number of turns, which is again compared with the one calculated by the algorithm in order to stop the rotation of the motor 13 when the current number of turns reaches number of total turns calculated by the algorithm.

The coffee machine and the method of controlling the coffee mill incorporated therein as thus conceived are susceptible of numerous modifications and variants, all falling within the scope of the inventive concept; moreover, all of the details are replaceable with technically equivalent elements.

The materials used, as well as the dimensions, may in practice be of any type, according to needs and the state of the art.

The invention claimed is:
1. A coffee machine (1) comprising:
a control unit (3),
a pump (4) for supplying infusion water,
a boiler (6) for heating the infusion water,
an infusion unit (7),
a coffee mill (2) comprising a hopper (10) for coffee beans, a rotating grinder (11) and a non-rotating grinder (12), a motor (13) for driving the rotating grinder (11), and an adjuster that controls a distance between the grinders (11, 12),
a user interface (8) comprising at least a selector (9) for a beverage or a ground coffee dose,
a first sensor (23) for detecting a number of turns of the rotating grinder (11), and
a second sensor (22) for detecting a distance between the grinders (11, 12),
wherein the control unit (3) stores an algorithm for calculating a correct dose of ground coffee, said algorithm configured to receive as an input from the selector (9) a value of ground coffee dose selected and from the second sensor (22) a value of the distance between the grinders (11, 12) to automatically generate as an output a value of a number of total turns that the rotating grinder (11) must perform, at the certain value of the distance between the grinders (11,12), to obtain the correct dose of ground coffee, said control unit (3) configured to receive as an input from the first sensor (23) a present value of a number of turns of the rotating grinder (11) to produce a stop signal for stopping the motor (13) upon reaching said number of total turns.

2. The coffee machine (1) of claim 1, further comprising a selector that adjusts said number of total turns calculated by the algorithm.

3. The coffee machine (1) of claim 2, wherein said selector comprises a flavor selector (25) comprised in said user interface (8).

4. The coffee machine (1) of claim 1, further comprising a third sensor (26) for detecting a resence in the hopper (10) of a minimum amount of coffee beans.

5. The coffee machine (1) of claim 1, wherein infusion parameters are pre-set.

6. The coffee machine (1) of claim 1, further comprising at least one infusion selector that adjusts infusion parameters.

7. The coffee machine (1) of claim 6, wherein said at least one infusion selector that adjusts the infusion parameters comprises at least one selector switch comprised in said user interface (8).

8. A process to control a coffee mill (2) of a coffee machine (1), wherein said coffee machine (1) comprises:
a control unit (3),
a pump (4) for supplying infusion water,
a boiler (6) for heating the infusion water,
an infusion unit (7),
a user interface (8) comprising at least a selector (9) for a beverage or a ground coffee dose, and
wherein said coffee mill (2) comprises:
a hopper (10) for coffee beans,
a rotating grinder (11) and a non-rotating grinder (12),
a motor (13) for driving the rotating grinder (11), and
an adjuster that controls a distance between the grinders (11, 12),
wherein the control unit (3) operates a grinding cycle according to the following steps:
acquiring from the selector (9) a selection of a ground coffee dose;
acquiring a value of a distance between the grinders (11, 12);
calculating a number of total turns that the rotating grinder (11) must perform during the grinding cycle to obtain a correct dose of ground coffee on a basis of the acquired selection of the ground coffee dose and the acquired value of the distance between the grinders (11, 12);

activating the grinding cycle by driving in rotation the rotating grinder (11);

acquiring, during the grinding cycle, a present value of a number of turns of the rotating grinder (11); and stopping rotation of the rotating grinder (11) upon reaching said number of total turns calculated.

\* \* \* \* \*